United States Patent
Feng et al.

(10) Patent No.: US 10,919,749 B2
(45) Date of Patent: Feb. 16, 2021

(54) METHOD FOR FILLING PRINTING INK IN ELECTROWETTING DISPLAY SUBSTRATE AND METHOD FOR PRODUCING ELECTROWETTING DISPLAY PANEL

(71) Applicants: BOE TECHNOLOGY GROUP CO., LTD., Beijing (CN); Chengdu BOE Optoelectronics Technology Co., Ltd., Sichuan Province (CN)

(72) Inventors: Yuanming Feng, Beijing (CN); Xiaohui Wu, Beijing (CN); Xi Xiang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

(*) Notice: Subject to any disclaimer, the term of this patent is extended or adjusted under 35 U.S.C. 154(b) by 270 days.

(21) Appl. No.: 15/925,716

(22) Filed: Mar. 19, 2018

(65) Prior Publication Data

US 2019/0016578 A1 Jan. 17, 2019

(30) Foreign Application Priority Data

Jul. 14, 2017 (CN) .......................... 201710578600.X

(51) Int. Cl.
*B67C 3/00* (2006.01)
*B08B 9/032* (2006.01)
(Continued)

(52) U.S. Cl.
CPC ............ *B67C 3/007* (2013.01); *B08B 9/0321* (2013.01); *B23P 19/04* (2013.01); *B29C 65/002* (2013.01);
(Continued)

(58) Field of Classification Search
CPC ........ G02B 5/223; G02B 5/24; G02B 26/004; G02B 26/005; G02B 2270/115; G09G 3/348; B01L 2400/0427
See application file for complete search history.

(56) References Cited

U.S. PATENT DOCUMENTS 6,630,274 B1 * 10/2003 Kiguchi ................. G02B 5/201
347/106
7,522,332 B2 * 4/2009 Liang .................. C08G 18/5015
359/296
(Continued)

FOREIGN PATENT DOCUMENTS

CN 102929064 A 2/2013
CN 103270446 A 8/2013
(Continued)

OTHER PUBLICATIONS

Second Chinese Office Action dated Oct. 18, 2019, received for corresponding Chinese Application No. 201710578600.X, 15 pages.
(Continued)

*Primary Examiner* — Peter Dungba Vo
*Assistant Examiner* — Joshua D Anderson
(74) *Attorney, Agent, or Firm* — Kinney & Lange, P.A.

(57) ABSTRACT

This disclosure provides a method for filling printing ink in an electrowetting display substrate and a method for producing the electrowetting display panel. The electrowetting display substrate comprises a first substrate. The first substrate has pixel grids formed by pixel walls. The method for filling printing ink in an electrowetting display substrate comprises steps of: filling a mixture of an oil-containing printing ink and a solvent into the pixel grids, wherein the solvent has a boiling temperature lower than that of the oil, and the printing ink is soluble in the solvent; and vaporizing the solvent at a temperature that is lower than the boiling temperature of the oil and higher than or equal to the boiling
(Continued)

temperature of the solvent. The method may adjust the filling height of the printing ink effectively, and allow the filling heights of the printing ink in all pixel grids to be substantially the same, so as to enhance the display effect of the electrowetting display panel.

11 Claims, 2 Drawing Sheets

(51) Int. Cl.
  *B23P 19/04* (2006.01)
  *B29C 65/00* (2006.01)
  *F16J 15/04* (2006.01)
  *G02B 26/00* (2006.01)

(52) U.S. Cl.
  CPC ............. *F16J 15/04* (2013.01); *G02B 26/005* (2013.01); *G02B 2207/115* (2013.01)

(56) References Cited

U.S. PATENT DOCUMENTS

| | | | |
|---|---|---|---|
| 9,274,331 | B2 | 3/2016 | Feil |
| 2010/0108516 | A1 | 5/2010 | Bartels et al. |
| 2012/0268804 | A1 | 10/2012 | Hadwen |
| 2013/0188239 | A1 | 7/2013 | O'Keeffe |
| 2013/0278994 | A1 | 10/2013 | Feil |
| 2014/0226200 | A1* | 8/2014 | Nomura ............... G02B 26/005 359/290 |
| 2015/0293346 | A1* | 10/2015 | Dean ..................... G02B 26/005 29/428 |
| 2016/0005971 | A1* | 1/2016 | Li .......................... H01L 51/56 257/40 |

FOREIGN PATENT DOCUMENTS

| | | |
|---|---|---|
| CN | 103852887 A | 6/2014 |
| CN | 106125292 A | 11/2016 |
| CN | 106773013 A | 5/2017 |
| EP | 2514529 A2 | 10/2012 |

OTHER PUBLICATIONS

First Chinese Office Action dated Mar. 26, 2019, received for corresponding Chinese Application No. 201710578600.X.

* cited by examiner

METHOD FOR FILLING PRINTING INK IN ELECTROWETTING DISPLAY SUBSTRATE AND METHOD FOR PRODUCING ELECTROWETTING DISPLAY PANEL

CROSS REFERENCE OF RELATED APPLICATION

This disclosure claims the priority of Chinese Patent Application No. 201710578600.X filed on Jul. 14, 2017, which is incorporated herein in its entirety by reference.

TECHNICAL FIELD

This disclosure relates to the technical field of electrowetting, and in particular, to a method for filling a printing ink in an electrowetting display substrate and a method for producing an electrowetting display panel.

BACKGROUND ART

Electrowetting display refers to a process, in which the surface tension between a liquid (i.e. a printing ink) and a solid is changed by changing the voltage applied between the liquid and a solid electrode, so that change of the liquid distribution is effected by changing the contact angle of the liquid on the surface of the solid, thereby finally achieving the function of an optical switch for a transmitted light or a reflected light and succeeding in display. The fundamental principle thereof is: changing the contact angle of the liquid in the display unit by applied voltage, further changing the distribution of the liquid, and finally achieving the function of switch for the transmitted light or the reflected light. When three switches of this type are applied in three primary colors (red, green, and blue), the purpose of color display is achieved by switches for these three colors. Since this kind of display can utilize external light sources and can be driven by energy only at the locations where light emission is desired, it has a range of advantages, such as low energy consumption, abundant colors, small volume, short response time, and the like.

An electrowetting display substrate comprises a first substrate and a second substrate, which is aligned with the first substrate. The first substrate has pixel grids formed by pixel walls. In the pixel grids, a printing ink is filled. The method for filling the grids with the printing ink may comprise a dipping process and a spin coating process. It is hard to make the filling amounts of the printing ink in all pixel grids substantially equal, and it is hard to adjust efficiently the filling height, by means of dipping process and spin coating process.

SUMMARY

In one aspect of this disclosure, a method is provided for filling printing ink in an electrowetting display substrate, wherein the electrowetting display substrate comprises a first substrate, and wherein the first substrate has pixel grids formed by pixel walls, the method comprising steps of:

filling a mixture of an oil-containing printing ink and a solvent into the pixel grids, wherein the solvent has a boiling temperature lower than that of the oil, and the printing ink is soluble in the solvent; and vaporizing the solvent at a temperature that is lower than the boiling temperature of the oil and higher than or equal to the boiling temperature of the solvent.

According to an embodiment of this disclosure, the mixture of the printing ink and the solvent is formed by mixing the solvent and the printing ink.

According to another embodiment of this disclosure, a volume ratio of the printing ink to the solvent is 9:1 to 3:2.

According to another embodiment of this disclosure, the filling comprises any of dipping, injecting, spin coating, and blade coating, and slit coating.

According to another embodiment of this disclosure, the vaporizing is carried out in vacuum.

According to another embodiment of this disclosure, the boiling temperature of the solvent is lower than the boiling temperature of the oil by at least 50° C. at the standard atmospheric pressure.

According to another embodiment of this disclosure, the boiling temperature of the solvent is 100° C. or less at the standard atmospheric pressure.

According to another embodiment of this disclosure, the solvent is selected from ethyl acetate, propyl acetate, methyl acetate, methyl formate, ethyl formate, propyl formate, methyl propionate, ethyl propionate, acetone, ethyl ether, hexane, heptane, dichloroethane, trichloroethane, carbon tetrachloride, chloroform, or any combination thereof.

According to another embodiment of this disclosure, the method further comprises rinsing a zone of the first substrate excluding the pixel grids after the filling.

According to another embodiment of this disclosure, the method further comprises filling the pixel grids with a hydrophilic liquid, which is on the printing ink, after the rinsing.

According to another embodiment of this disclosure, the hydrophilic liquid is water or a mixture of water and a hydrophilic solvent.

According to another embodiment of this disclosure, the printing ink comprises the oil and an oil-soluble dye.

According to another embodiment of this disclosure, the oil-soluble dye has a weight percent of 0.5-10% in the printing ink.

According to another embodiment of this disclosure, the pixel grids have a hydrophobic bottom surface.

In another aspect of this disclosure, provided is a method for producing an electrowetting display panel, comprising the method for filling printing ink in an electrowetting display substrate according to any of above.

According to another embodiment of this disclosure, the method for producing an electrowetting display panel further comprises steps of:

coating a second substrate with a sealant;

aligning the second substrate coated with the sealant and the first substrate obtained after the solvent has been vaporized; and curing the sealant, to obtain the electrowetting display panel.

BRIEF DESCRIPTION OF THE DRAWINGS

In order to describe the technical solutions in examples of this disclosure more clearly, drawings needed to be used in illustration for examples will be described briefly below. Obviously, the drawings in the description below are only exemplary examples of this disclosure. For a person skilled in the art, other drawings may be obtained according to these drawings without inventive labor.

DETAILED DESCRIPTION

The technical solutions in examples of this disclosure will be clearly and fully described by incorporating detailed embodiments of this disclosure. Obviously, the embodiments and/or examples described are only a part of embodiments and/or examples of this disclosure, but not all embodiments and/or examples. On the basis of the embodiments and/or examples in this disclosure, all other embodiments and/or examples obtained by a person skilled in the art without inventive labor belong to the protection scope of this disclosure.

In this disclosure, the ratios, amounts, parts, or the like is in term of volume, unless otherwise specifically indicated. Further, in this disclosure, layer and membrane may be used interchangeable. The terms "first" and "second" are used only for the purpose of description, but not understood as indicating or implying relative importance or impliedly indicating the amount of the technical feature, to which these terms refer. Thereby, a feature limited by "first" or "second" may comprise explicitly or impliedly one or more such features.

In this disclosure, "heights that are substantially the same" means heights are within the error range permitted by experiments, such as in 10% or less, 5% or less, or 1% or less, of the average height.

Figure 1:
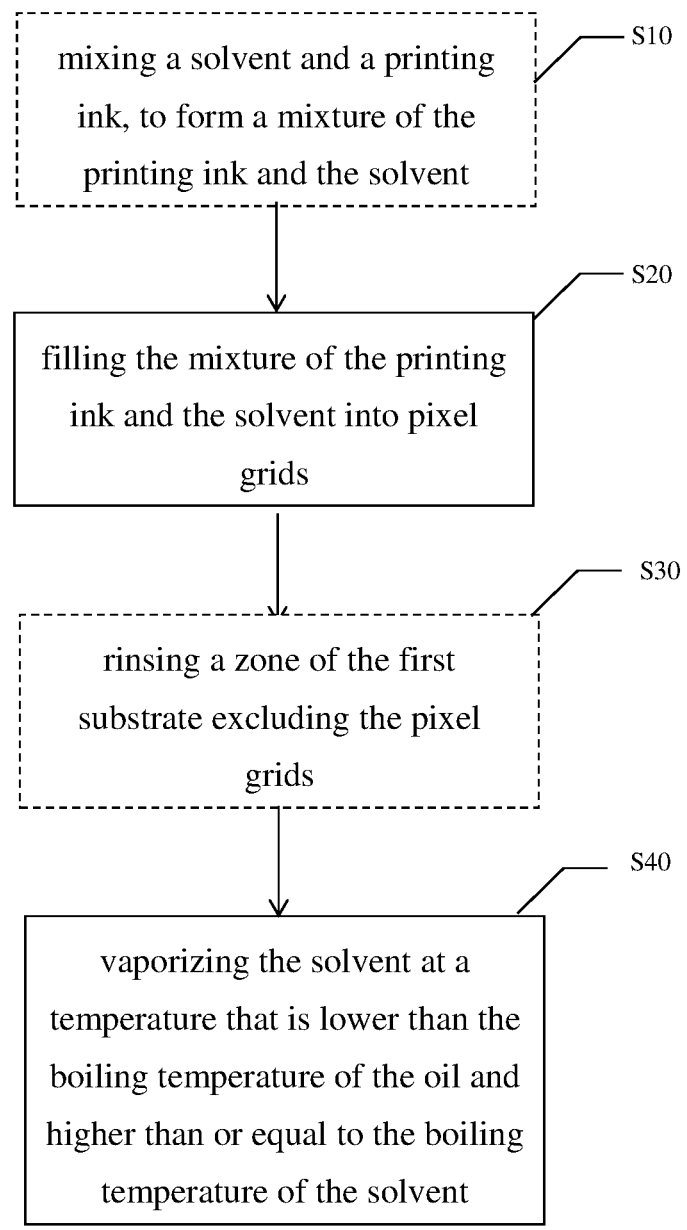
FIG. 1 is a schematic flow chart of the method for filling printing ink in an electrowetting display substrate, according to an embodiment of this disclosure.

FIG. 1 is a schematic flow chart of the method for filling printing ink in an electrowetting display substrate, according to an embodiment of this disclosure.

The method for filling printing ink in an electrowetting display substrate shown in FIG. 1 may comprise steps of:

S20: filling a mixture of a printing ink and a solvent into pixel grids; and

S40: vaporizing the solvent at a temperature that is lower than the boiling temperature of the oil and higher than or equal to the boiling temperature of the solvent.

The method may further comprise a step S10 prior to the step S20: mixing the solvent and the printing ink, to form the mixture of the printing ink and the solvent.

According to this disclosure, filling heights of printing ink in all pixel grids may be substantially the same, so as to enhance the display effect of the electrowetting display panel.

The method may further comprise a step S30 between the step S20 and the step S40: rinsing a zone of the first substrate excluding the pixel grids.

In an aspect of this disclosure, a method for filling printing ink in an electrowetting display substrate may be provided, wherein the electrowetting display substrate comprises a first substrate, wherein the first substrate has pixel grids formed by pixel walls, the method comprises steps of:

filling a mixture of an oil-containing printing ink and a solvent into the pixel grids (S20), wherein the solvent has a boiling temperature lower than that of the oil, and the printing ink is soluble in the solvent; and vaporizing the solvent at a temperature that is lower than the boiling temperature of the oil and higher than or equal to the boiling temperature of the solvent (S40). Optionally, the solvent are completely vaporized, and only printing ink is remained in the pixel grids.

According to an embodiment of this disclosure, the mixture of the printing ink and the solvent may be formed by mixing the solvent and the printing ink (S10).

According to another embodiment of this disclosure, a volume ratio of the printing ink to the solvent may be 9:1 to 3:2, for example, 8:1 to 3:2, 7:1 to 3:2, 6:1 to 3:2, 5:1 to 3:2, 4:1 to 3:2, or 3:1 to 3:2. The filling height of the printing ink or the amount of the printing ink in the pixel grids may be effectively adjusted by adjusting the volume ratio of the printing ink to the solvent.

According to another embodiment of this disclosure, the filling step (S20) may be carried out by dipping, injecting, spin coating, blade coating, and slit coating.

According to another embodiment of this disclosure, the vaporizing step (S40) may be carried out at the normal pressure or at a reduced pressure. For example, the vaporizing step (S40) may be carried out in vacuum, wherein the degree of vacuum may be the achievable lowest degree of vacuum. For example, the degree of vacuum may be $1\times10^{-9}$ Pa to 20000 Pa. The lower limit of the degree of vacuum may be, for example, $1\times10^{-8}$ Pa, $1\times10^{-7}$ Pa, $1\times10^{-6}$ Pa, $1\times10^{-5}$ Pa, $1\times10^{-4}$ Pa, $1\times10^{-3}$ Pa, $1\times10^{-2}$ Pa, $1\times10^{-1}$ Pa, 1 Pa, 2 Pa, 3 Pa, 4 Pa, 5 Pa, 6 Pa, 7 Pa, 8 Pa, 9 Pa, or 10 Pa. The upper limit of the degree of vacuum may be, for example, 18000 Pa, 16000 Pa, 14000 Pa, 12000 Pa, 10000 Pa, 9000 Pa, 8000 Pa, or 7000 Pa. The vaporizing may be carried out in the filling region uniformly, so that the liquid levels in all pixel grids descends equally, so as to obtain filling heights of the printing ink that are substantially the same.

Figure 2:
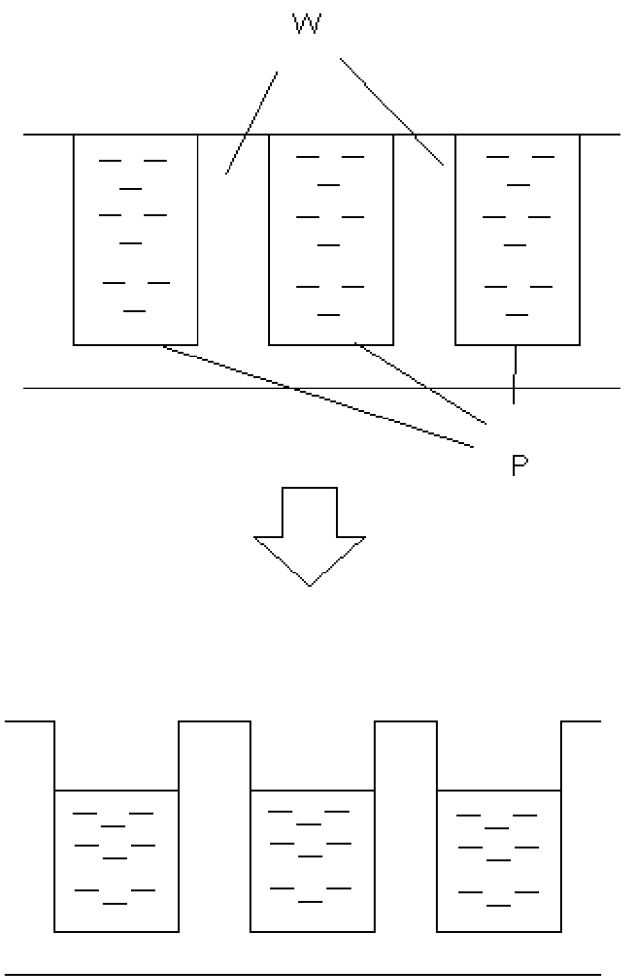
FIG. 2 is a schematic illustrating filling states in pixel grids before and after vaporization, according to an embodiment of this disclosure.

The process of vaporizing may be as shown in FIG. 2. Firstly, a mixture of a printing ink and a solvent is filled in pixel grids P formed by pixel walls W. Once vaporization is performed, the solvents in the pixel grids are vaporized simultaneously, the liquid levels in all pixel grids descend synchronistically, and finally a desired filling height of the printing ink is obtained.

According to another embodiment of this disclosure, the printing ink used in the electrowetting display substrate may comprise an oil-soluble dye and the oil. For example, the oil may be alkane having 9-16 carbon atoms, such as nonane, decane, undecane, dodecane, tridecane, tetradecane, pentadecane, and hexadecane; and esters and ketones, which are liquids at a normal temperature and have boiling temperatures of 150° C. or more, such as isopentyl heptanate and cyclohexanone. According to another embodiment of this disclosure, the oil-soluble dye may comprise oil soluble blue, oil soluble yellow, oil soluble red, oil soluble green, or oil soluble purple. According to another embodiment of this disclosure, the oil-soluble dye may have a weight percent of 0.5-10% in the printing ink.

According to another embodiment of this disclosure, the oil of the printing ink may be soluble in or miscible with the solvent.

According to another embodiment of this disclosure, at the standard atmospheric pressure, the boiling temperature of the solvent may be lower than the boiling temperature of the oil by at least 50° C., for example, by at least 60° C., by at least 70° C., by at least 80° C., by at least 90° C., by at least 100° C. or by at least 110° C.

According to another embodiment of this disclosure, at the standard atmospheric pressure, the boiling temperature of the solvent may be 100° C. or less, for example, 95° C. or less, 90° C. or less, 85° C. or less, or 80° C. or less.

According to another embodiment of this disclosure, the solvent may be selected from ethyl acetate, propyl acetate, methyl acetate, methyl formate, ethyl formate, propyl formate, methyl propionate, ethyl propionate, acetone, ethyl ether, hexane, heptane, dichloroethane, trichloroethane, carbon tetrachloride, chloroform, or any combination thereof. For example, the solvent may be ethyl acetate or hexane.

According to another embodiment of this disclosure, the vaporized solvent may be recovered, for example, by condensation. According to another embodiment of this disclosure, the recovered solvent may be used to produce the mixture of the printing ink and the solvent.

According to another embodiment of this disclosure, the method may further comprise a step of rinsing a zone of the first substrate excluding the pixel grids (S30) after the filling step (S20). For example, the rinsing (S30) may be carried out with water, such as deionized water.

According to another embodiment of this disclosure, the method may further comprise a step of filling the pixel grids with a hydrophilic liquid after the rinsing. The hydrophilic liquid is on the printing ink. The hydrophilic liquid may comprise water and a mixture of water and any hydrophilic solvent. The hydrophilic solvent may comprise, for example, ethanol, methanol, acetic acid, formic acid, etc.

According to another embodiment of this disclosure, the first substrate may comprise an electrode layer, an insulating layer, an insulating hydrophobic layer, and pixel grids formed by pixel walls.

In another aspect of this disclosure, provided is a method for producing an electrowetting display panel, comprising the method for filling printing ink in an electrowetting display substrate according to any of above.

According to another embodiment of this disclosure, the method for producing an electrowetting display panel further comprises steps of:

coating a second substrate with a sealant;

aligning the second substrate coated with the sealant and the first substrate obtained after the solvent has been vaporized; and curing the sealant, to obtain the electrowetting display panel.

According to another embodiment of this disclosure, the sealant may comprise epoxy acrylic resin, acrylic resin, a thermocuring agent, a photoinitiator, an organic filler, and a coupling agent, and optionally comprise a graphene-polymer composite.

The method for producing an electrowetting display panel comprises the steps of: performing defoaming treatment to the sealant mentioned above in a lucifuge condition, to obtain a sealant subjected to defoaming treatment; coating the sealant subjected to defoaming treatment onto the frame of the second substrate, to obtain a second substrate coated with the sealant; aligning the second substrate coated with the sealant and the first substrate obtained after the solvent has been vaporized, so as to obtain a aligned product; and subjecting the aligned product to UV polymerization and thermal polymerization, to obtain the electrowetting display panel.

According to an embodiment of this disclosure, the duration of the defoaming treatment may be 1 to 5 h.

According to a further aspect of the disclosure, an electrowetting display may be provided, wherein the electrowetting display comprises the electrowetting display panel mentioned above.

According to a still further aspect of the disclosure, a shutter device may be provided, wherein the shutter device comprises the electrowetting display panel mentioned above.

According to this disclosure, the filling height of printing ink may be effectively adjusted by providing the method for filling printing ink in an electrowetting display substrate and the method for producing an electrowetting display panel, and filling heights of printing ink in all pixel grids may be substantially the same, so that the display effect of the electrowetting display panel may be enhanced. Further, according to the methods of this disclosure, since the filling amount of the printing ink is smaller, the printing ink may be spared. Additionally, the used solvent may be recovered and reused.

EXAMPLE

In Examples below, the parts and ratios are in term of volume, unless otherwise specifically indicated. The Examples are used for the purpose of exemplification, and should not be regarded as limiting the scope of this disclosure.

Materials used in the Examples were as follows:

printing ink A: 1 wt. % (in term of mass fraction, 1 part by weight) oil soluble yellow solution in tetradecane solvent A: ethyl acetate solvent B: hexane a 7:3 mixture of the printing ink A and the solvent A substrate A: comprising an electrode layer, an insulating layer, an insulating hydrophobic layer, and pixel grids formed by pixel walls; size of the substrate A: 10053.12 μm*10053.12 μm; number of pixels: 32*32

Example 1

The 7:3 mixture of the printing ink A and the solvent A was spin coated into pixel grids of the substrate A. Then, the substrate A was dried by heating it at a pressure of 0.02 MPa, so that the mixture of the printing ink and the solvent boils, to vaporize the solvent A.

The printing ink in the pixel grids obtained thereby was observed. It was found that the height of the printing ink was 70% of the height of the pixel walls. Heights of printing ink in all pixel grids are the same.

Example 2

70 parts of the printing ink A and 30 parts of the solvent B were mixed, to obtain a 7:3 mixture of the printing ink A and the solvent B. The 7:3 mixture of the printing ink A and the solvent B was spin coated into pixel grids of the substrate A. Then, the substrate A was dried by heating it at a pressure of 0.03 MPa, so that the mixture of the printing ink and the solvent boils, to vaporize the solvent B.

The printing ink in the pixel grids obtained thereby was observed. It was found that the height of the printing ink was 70% of the height of the pixel walls. Heights of printing ink in all pixel grids are the same.

Example 3

40 parts of the printing ink A and 10 parts of the solvent A were mixed, to obtain a 4:1 mixture of the printing ink A and the solvent A. The substrate A was dipped in the 4:1 mixture of the printing ink A and the solvent A, so that the pixel grids of the substrate A were filled up with the mixture. Then, the substrate A was rinsed by water, to wash off the mixture of the printing ink and the solvent outside the pixel grids. Then, the substrate A was dried by heating it at a pressure of 0.02 MPa, so that the mixture of the printing ink and the solvent boils, to vaporize the solvent A.

The printing ink in the pixel grids obtained thereby was observed. It was found that the height of the printing ink was 80% of the height of the pixel walls. Heights of printing ink in all pixel grids are the same.

As can be seen from the Examples, the Examples of this disclosure may adjust the filling height of the printing ink effectively, and allow the filling heights of the printing ink in all pixel grids to be substantially the same, so as to enhance the display effect of the electrowetting display panel. Since the filling amount of the printing ink is smaller, the printing ink may be spared.

It is apparent that a person skilled in the art may perform various changes and modifications to the Examples of this disclosure without departing from the spirit and scope of this disclosure. Thus, when these changes and modifications pertain to the scope of the claims and equivalent technology thereof in this disclosure, it is intended that these changes and modifications are included in this disclosure.

What is claimed is:

1. A method for filling printing ink in an electrowetting display substrate, wherein the electrowetting display substrate comprises a first substrate, and wherein the first substrate has pixel grids formed by pixel walls, the method comprising steps of:
    filling a mixture of an oil-containing printing ink and a solvent into the pixel grids by dipping to completely fill the pixel grids, so that an excess amount of the mixture of the oil-containing printing ink and the solvent is present outside the pixel grids, wherein the solvent has a boiling temperature lower than that of the oil, and the printing ink is soluble in the solvent;
    rinsing a zone of the first substrate excluding the pixel grids with water, so that the excess amount of the mixture of the oil-containing printing ink and the solvent that is present outside the pixel grids is washed off by the water, so that the pixel grids are completely filled up with the mixture of the oil-containing printing ink and the solvent; and
    vaporizing the solvent in each of the pixel grids at a temperature that is lower than the boiling temperature of the oil and higher than or equal to the boiling temperature of the solvent, so as to obtain filling heights of the oil-containing printing ink in each of the pixel grids that are substantially the same,
    wherein the solvent is selected from ethyl acetate, propyl acetate, methyl acetate, methyl formate, ethyl formate propyl formate, methyl propionate, ethyl propionate, acetone, ethyl ether, dichloroethane, trichloroethane, carbon tetrachloride, chloroform, or any combinations thereof.

2. The method for filling printing ink in an electrowetting display substrate according to claim 1, wherein the mixture of the printing ink and the solvent is formed by mixing the solvent and the printing ink.

3. The method for filling printing ink in an electrowetting display substrate according to claim 1, wherein a volume ratio of the printing ink to the solvent is 9:1 to 3:2.

4. The method for filling printing ink in an electrowetting display substrate according to claim 1, wherein the step of vaporizing is carried out in vacuum.

5. The method for filling printing ink in an electrowetting display substrate according to claim 1, the method further comprising:
    filling the pixel grids with a hydrophilic liquid, which is on the printing ink, after the step of rinsing.

6. The method for filling printing ink in an electrowetting display substrate according to claim 5, wherein the hydrophilic liquid is water or a mixture of water and a hydrophilic solvent.

7. The method for filling printing ink in an electrowetting display substrate according to claim 1, wherein the printing ink comprises the oil and an oil-soluble dye.

8. The method for filling printing ink in an electrowetting display substrate according to claim 7, wherein the oil-soluble dye has a weight percent of 0.5-10% in the printing ink.

9. The method for filling printing ink in an electrowetting display substrate according to claim 1, wherein the pixel grids have a hydrophobic bottom surface.

10. A method for producing an electrowetting display panel, comprising the method for filling printing ink in an electrowetting display substrate according to claim 1.

11. The method for producing an electrowetting display panel according to claim 10, further comprising steps of:
    coating a second substrate with a sealant;
    aligning the second substrate coated with the sealant and the first substrate obtained after the solvent has been vaporized; and
    curing the sealant, to obtain the electrowetting display panel.

* * * * *